United States Patent
Esch

[11] 3,774,312
[45] Nov. 27, 1973

[54] COORDINATE MEASURING MACHINE
[75] Inventor: Robert E. Esch, Dayton, Ohio
[73] Assignee: The Bendix Corporation, Southfield, Mich.
[22] Filed: June 30, 1971
[21] Appl. No.: 158,233

[52] U.S. Cl. ............................................. 33/174 L
[51] Int. Cl. ........................... G01b 3/22, G01b 5/20
[58] Field of Search ...................... 33/174 L, 174 P, 33/1 M, 23 C; 308/1 R

[56] References Cited
UNITED STATES PATENTS
3,403,448  10/1968  Aller ................................. 33/178 L
3,434,218  3/1969   Potter ................................ 33/1 M
2,746,813  5/1956   Massa ............................... 308/1 R Primary Examiner—Harry N. Haroian
Attorney—John R. Benefiel

[57] ABSTRACT

A coordinate measuring machine is disclosed of the type having a measuring probe traversed along coordinate axes by means of bearing supported carraiges with means for indicating the position of the probe by measuring the corresponding position of the carriages, the improvement consisting of means for impressing a vibratory movement on each carriage having a component along the direction of motion combined with an averaging arrangement for indicating the average position of each carriage so as to eliminate the non-correspondence between movement of the probe and movement of the carriage caused by bearing friction inducing structural deflection of the parts.

4 Claims, 2 Drawing Figures

COORDINATE MEASURING MACHINE

BACKGROUND OF THE INVENTION

1. Field of the Invention

This invention concerns measuring machines of the type in which a measuring probe is supported for movement along coordinate axes and the extent of such movement is measured to measure distances between points located in a plane defined by two such axes, or in the three-space defined by three such axes.

2. Description of the Prior Art

Coordinate measuring machines of the type disclosed in U.S. Pat. No. 3,403,448 have come into usage due to a number of advantages over earlier devices. In these devices a part is measured by traversing a probe to the points on the part to be measured and the extent of the probe traversing motion is measured and indicated by a precision measuring arrangment, such as the electro-optical system described in U.S. Pat. No. 2,886,717 to thus measure the distance between the points.

These devices support the probe for movement along the various axes by means of bearing supported carriages and the electro-optical or other measuring means measures the extent of travel of the carriage in order to determine the position of the probe.

These devices, however, suffer from an inherent inaccuracy in that they normally rely on perfect correspondence between the probe tip position and the carriage position whenever measurements are being taken. This relationship does not exist in fact, however, because frictional forces in the bearing arrangements, however low, are always present, and these frictional forces can cause deflection of the carriage and probe tip structure and thus cause relative movement therebetween so that true correspondence between the carriage travel and the travel of the probe during a measuring manipulation is not obtained.

Therefore, errors, may be introduced into the measurements of a magnitude dependent on the size of the frictional forces and the stiffness of the parts involved.

Therefore, it is an object of the present invention to minimize errors in this type of device due to such non-correspondence between the probe tip and the supporting structure.

SUMMARY OF THE INVENTION

These and other objects which will become apparent upon a reading of the following specification and claims is accomplished by incorporating means for imposing a forcing vibration of the carriage structure combined with means for indicating the average position along this axis so that the effects of such friction induced deflections and consequent relative movements is eliminated by creating a situation in which the average position of the carriage is that at zero deflection of probe and carriage structure.

DETAILED DESCRIPTION

In the following detailed description certain specific terminology will be utilized for the sake of clarity and specific embodiments will be described in order to provide a complete understanding of the invention, but it is to be understood that the invention is not so limited and may be practiced in a variety of forms and embodiments.

Figure 1:
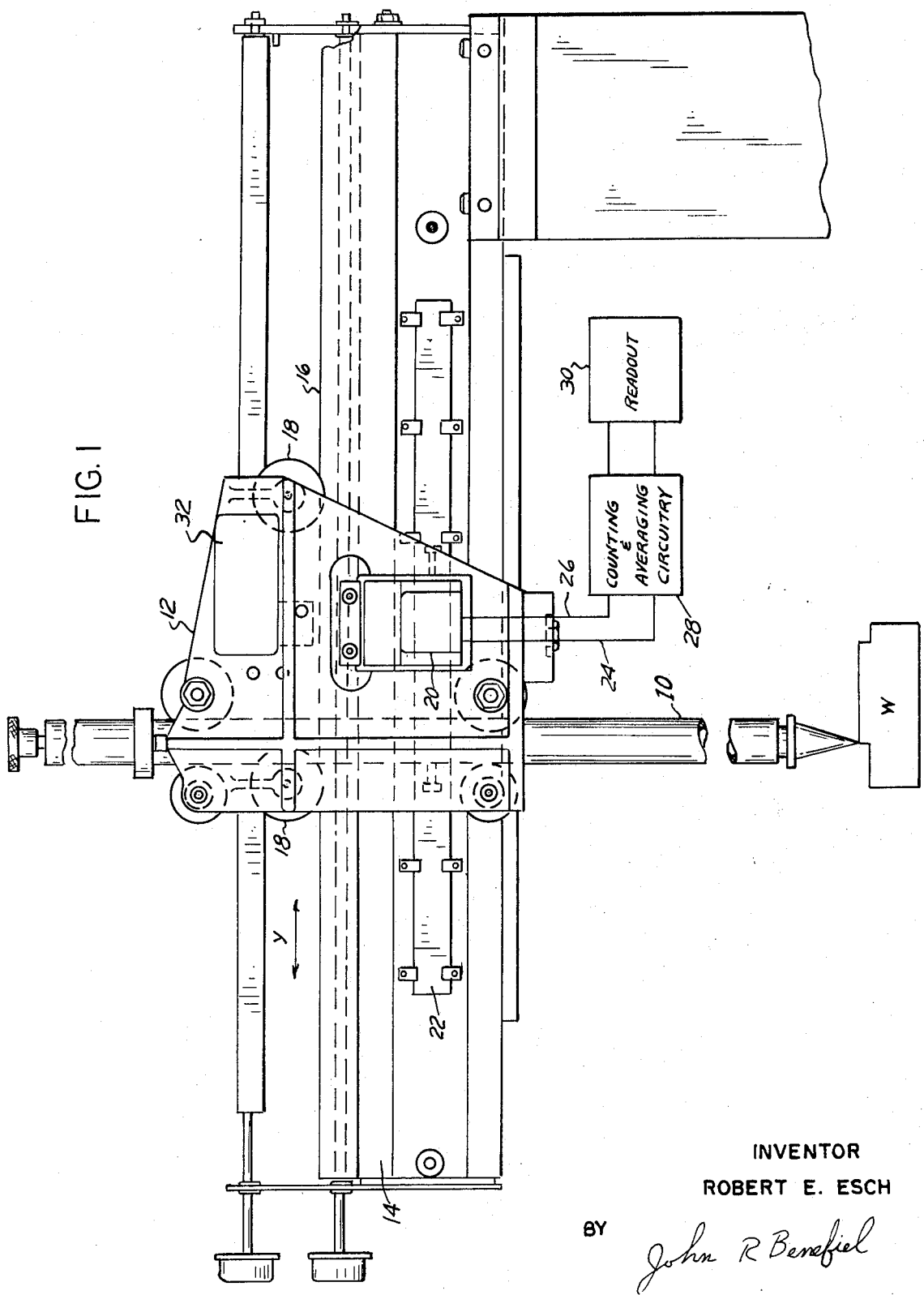
FIG. 1 is an elevational view of a carriage and probe arrangement together with a block diagram representation of the related transducer, and the signal processing and readout circuitry.

Referring to the drawings, and particularly FIG. 1, a measuring probe 10 is depicted, supported for traversing movement along the Y-axis by means of a carriage 12 supported on a Y-axis beam 14 for rolling movement along a track 16 fixed thereto by means of rollers 18 rotatably secured to the carriage 12.

A transducer arrangement is provided to provide output signals indicative of the extent and direction of travel of the carriage 12 relative to the Y-axis beam 14. This arrangement preferably takes the form of the electro-optic system described in the aforementioned patent which includes a reading head 20 and a precision grating 22 affixed to the Y-axis beam 14. This type of arrangment produces digital pulses which indicate an increment of movement, with movement in the "forward" direction producing pulses over line 24 and "reverse" movement producing pulses over line 26, for example.

Inasmuch as this system is well known in the art, it is not felt necessary to describe the same in any greater detail.

These pulses are normally counted to indicate the total travel from any given reference point to provide an indication of the net position of the carriage 12 relation to the Y-axis beam 14 at any moment, but according to the teaching of the present invention, this count is averaged by counting and averaging circuitry 28 and the average count as determined at regular intervals of time is displayed in the readout 30.

In order to induce the forced vibrations of the carriage 12 according to the teaching of the present invention, a reciprocal vibrator 32 is affixed to the carriage 12, and during its operation causes vibratory motion thereof having a principal component in the direction of the Y-axis motion. Any suitable vibrator may be used but the amplitude and forces generated thereby must be adequate to insure movement of the carriage and probe masses through the point of zero deflection of the structures involved.

This can be better understood by pointing out that the addition of the induced vibration creates a Coulomb damped, forced, spring-mass system, in which the Coulomb damping is created by the frictional forces and the spring is provided by the resiliency of the structure deflected thereby.

Such systems will tend to vibrate around the point of zero deflection of the spring, if the spring rate and/or forcing function are sufficient to drive the masses through the zero point against the Coulomb damping forces, and hence the average position will be that at zero deflection. Since the point of zero deflection is that at which exact correspondence exists between the position of the probe and the carriage, the average position readout will be the correct value of the carriage position free from the deflection effects of bearing friction.

Such an arrangement is provided for each axis carriage.

Figure 2:
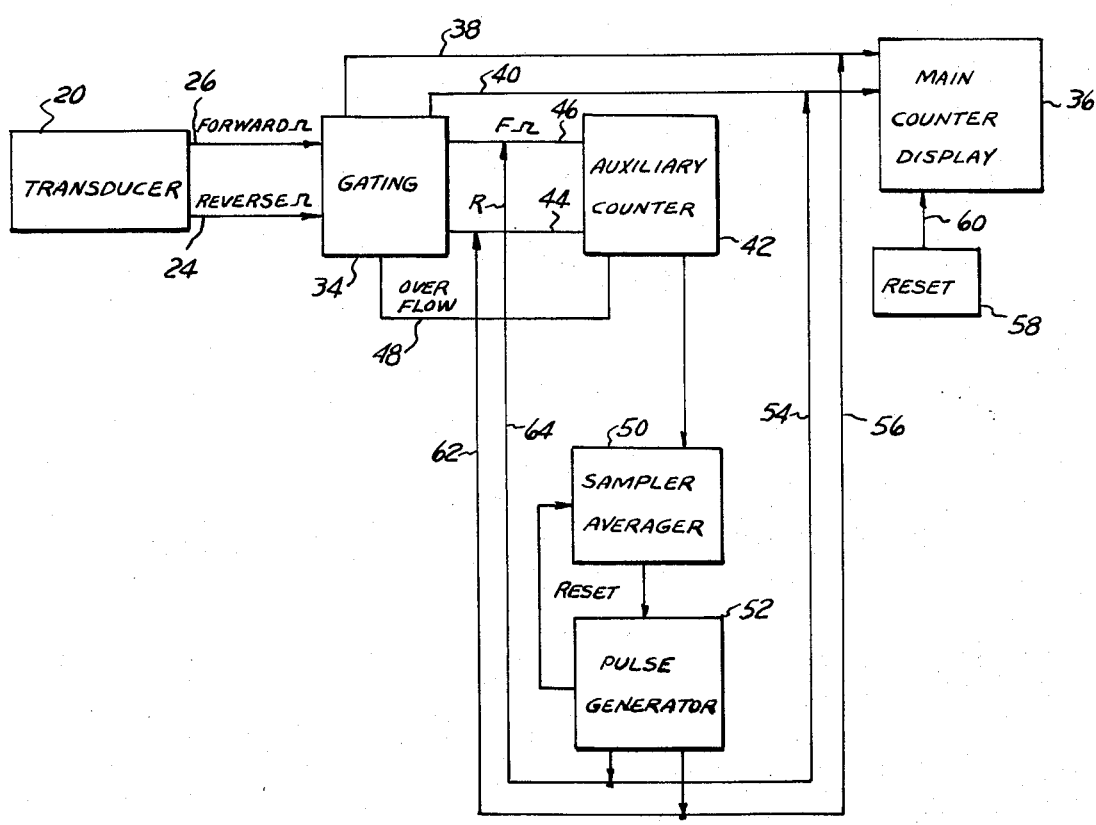
FIG. 2 is a block diagram representation of a preferred averaging arrangement for use in a measuring machine according to the present invention.

Referring to FIG. 2, an averaging arrangement suitable for use in the system described is depicted. The reading head 20 produces pulses over lines 24, 26 representative of increments of movement of the machine probe 12 in the forward or reverse direction, respectively.

Pulses over lines 24 and 26 are connected to a gating network 34 which causes the pulses to proceed either directly to the main counter and display 36 via lines 30 and 40 or to the auxiliary counter 42 via lines 44, 46 depending on the state of the auxiliary counter 42.

Auxiliary counter 42 is an up-down relatively small capacity counter (i.e., four bit for example) with count up occurring with pulses on line 46 and count down occurring with pulses on line 44.

A sign flip-flop may be utilized in order to distinguish the count in the auxiliary counter 42 as that corresponding to the forward or reverse direction.

In the event the auxiliary counter 42 contains a full count either corresponding to the forward or reverse direction, an overflow signal sent via line 40 controls the gating network 34, so that if an additional pulse is received over lines 24, 26, which pulse would add to the count of the full capacity counter 42, the pulse is then directed via line 38 or 40 directly to the main counter and display 36.

If the auxiliary counter 42 has not reached full capacity, the pulse is then routed by the gating network 34 thereto, and not to the main counter and display 36.

The count contained in the auxiliary counter 42 is periodically sampled by the sampler-averager 50, and the average of the samples taken is computed at regular time intervals. Many well-known methods exist for performing this function, and a particular system utilizing a sampling register, accumulator, adder, and divider is disclosed in some detail in copending application Ser. No. 146,712 filed May 25, 1971 (Attorney's Docket No. AUM 71-2) by the same inventor as the present application.

The count of the sampler-averager 50 is then transmitted to a pulse generator 52 which outputs a pulse count of the correct sign such that the sample average will be closer to zero after the next averaging cycle via lines 54, 56, so as to be added to that contained in the main counter and display 36, and at the same time subtracts this count from the auxiliary via lines 62, 64.

This pulse count may be either a single pulse, or the integer value of the sample average. In the first case the circuitry required is much simplified, but a relatively large number of averaging cycles may be required to reduce the auxiliary counter to zero. In the latter case, the system will settle in at most two averaging cycles, but the required circuitry would be more complex.

In operation, if the probe 12 is being traversed by the operator, a train of pulses is received over either line 24 or 26 which pulses are routed to the auxiliary counter 42 over either line 44 or 46 until it becomes full in one or the other direction, at which point the overflow signal on line 48 causes rerouting of all additional pulses in the full direction by the gating network 34 directly to the main counter and display 36. Hence, the count displayed during traversing lags at a maximum only by the capacity of the auxiliary counter 42.

Upon cessation of the traversing, the vibrator causes a constantly varying pulse output from the reading head 20 and the sampler-averager 50 will determine the average count thereof, and the pulse generator 52 will then add this value to the main counter 36 and subtract it from the auxiliary counter 42, until the average count in the auxiliary counter 42 during an averaging interval is zero. Thus, if the excursion of the induced vibrations corresponds to a pulse count within the capacity of the auxiliary counter 42, the main counter and display 36 will display the true average value of the probe position corresponding to the average value of the pulse count received over lines 24 and 26, while the auxiliary counter 42 will continuously receive every pulse from lines 24 and 26, with the sampler-averager 50 and pulse generator 52 ready to update the main counter and display 36 if the average count received in the auxiliary counter shifts from zero due to traversing.

This arrangement also will eliminate the effects of spurious vibrations superimposed on the induced vibrations although the spurious vibrations will normally be of much lesser magnitude than the induced vibrations.

Thus, a readout is obtained which remains relatively constant and allowing easy and accurate reading thereof by the operator, and which reading is indicative of the true position of the probe along the axis in question.

Such a system is provided for each coordinate axis.

While a specific embodiment has been described, the invention is not to be so limited and many variations are of course possible within the scope of the present invention.

What is claimed is:

1. A measuring machine for measuring distances along a path comprising:
    a probe member;
    a carriage member carrying said probe member and supported for movement along said path;
    vibrator means for inducing a vibratory motion on said carriage in the direction of said path;
    measuring means providing an output signal indicative of the average position of said carriage during a time interval, and including a readout of said output signal, whereby the effects of friction induced deflection of said probe and carriage on the correspondence of said carriage and probe position is minimized.

2. The measuring machine of claim 1 wherein said carriage is supported for linear movement by bearing means.

3. The measuring machine of claim 1 wherein said measuring means includes a transducer producing pulses corresponding to increments of forward or reverse movement along said path and further includes counter means counting said pulses to provide signals indicative of the position of said carriage along said path.

4. A method of measuring distances between points comprising the steps of:
    supporting a probe for movement between said points on a supporting structure;
    inducing vibratory motion of said supporting structure along the direction of said motion of sufficient amplitude so that the average position of said supporting structure is that at which no deflection exists whih causes non-correspondence between said probe and said supporting structure;
    measuring the average position over intervals of time of said supporting structure while moving the probe from one of said points to the other and displaying the measured average position whereby said displayed measurement corresponds exactly to the extent of movement of said probe.

* * * * *